United States Patent
Ciaramella et al.

(10) Patent No.: US 9,807,480 B2
(45) Date of Patent: Oct. 31, 2017

(54) OPTICAL ACCESS NETWORK

(71) Applicant: Telefonaktiebolaget L M Ericsson (publ), Stockholm (SE)

(72) Inventors: Ernesto Ciaramella, Rome (IT); Marco Presi, Peccioli (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/344,168

(22) Filed: Nov. 4, 2016

(65) Prior Publication Data

US 2017/0078773 A1 Mar. 16, 2017

Related U.S. Application Data

(62) Division of application No. 14/236,071, filed as application No. PCT/EP2011/063163 on Jul. 29, 2011, now Pat. No. 9,525,922.

(51) Int. Cl.
*H04B 10/00* (2013.01)
*H04Q 11/00* (2006.01)
(Continued)

(52) U.S. Cl.
CPC ..... *H04Q 11/0005* (2013.01); *H04B 10/2587* (2013.01); *H04B 10/272* (2013.01);
(Continued)

(58) Field of Classification Search
CPC H04Q 11/0005; H04B 10/532; H04B 10/272; H04B 10/2587; H04J 14/0246;
(Continued)

(56) References Cited

U.S. PATENT DOCUMENTS 7,181,142 B1 * 2/2007 Xu ............................ H04J 3/14
398/58
7,203,422 B2 * 4/2007 Kani .................. H04J 14/0226
385/24
(Continued)

FOREIGN PATENT DOCUMENTS

CN 102047588 A 5/2011
JP 2004096564 A 3/2004
(Continued)

OTHER PUBLICATIONS

Cho, et al., "Self-Polarization-Stabilization Technique for Long-Reach Coherent WDM PON," Conference on Optical Fiber Communication (OFC), Collocated National Fiber Optic Engineers Conference, IEEE, 2010, 3 pages.
(Continued)

*Primary Examiner* — Danny Leung
(74) *Attorney, Agent, or Firm* — Nicholson De Vos Webster & Elliott, LLP

(57) ABSTRACT

An optical access network comprises an optical network unit having a first port for connecting to a first optical link, a second port for connecting to a second optical link and an optical source. The optical source is arranged to generate a first optical signal, to transmit the first optical signal via the first port, to receive an optical seed signal via the first port and to amplify the optical seed signal. The optical seed signal has a narrower bandwidth compared to the first optical signal. A modulator is arranged to modulate the amplified optical seed signal with upstream data to form an upstream optical signal and to transmit the upstream optical signal via the second port. A polarisation modifier can modify polarisation of the first optical signal.

12 Claims, 7 Drawing Sheets

(51) Int. Cl.
*H04J 14/02* (2006.01)
*H04J 14/06* (2006.01)
*H04B 10/2587* (2013.01)
*H04B 10/272* (2013.01)
*H04B 10/532* (2013.01)

(52) U.S. Cl.
CPC .......... *H04B 10/532* (2013.01); *H04J 14/025* (2013.01); *H04J 14/0246* (2013.01); *H04J 14/0282* (2013.01); *H04J 14/06* (2013.01); *H04J 14/0247* (2013.01); *H04J 14/0252* (2013.01); *H04J 2014/0253* (2013.01); *H04Q 2011/0009* (2013.01); *H04Q 2011/0016* (2013.01); *H04Q 2011/0022* (2013.01)

(58) Field of Classification Search
CPC .. H04J 14/0282; H04J 14/025; H04J 14/0252; H04J 14/06; H04J 14/0247; H04J 2014/0253
See application file for complete search history.

(56) References Cited

U.S. PATENT DOCUMENTS

| | | | | |
|---|---|---|---|---|
| 7,389,048 | B2* | 6/2008 | Kani | H04J 14/0226 385/24 |
| 7,680,416 | B2* | 3/2010 | Hann | H04J 14/02 398/66 |
| 8,606,106 | B2* | 12/2013 | Healey | H04J 3/0682 398/102 |
| 2005/0041972 | A1* | 2/2005 | Kim | H04J 14/02 398/78 |
| 2006/0082866 | A1* | 4/2006 | Takahashi | H04B 10/2916 359/334 |
| 2006/0159464 | A1* | 7/2006 | Cornwell | H04B 10/071 398/169 |
| 2008/0187314 | A1* | 8/2008 | Chung | H04B 10/2587 398/72 |
| 2009/0060521 | A1* | 3/2009 | Lin | H04B 10/2587 398/140 |
| 2010/0260496 | A1* | 10/2010 | Tosetti | H04B 10/2587 398/7 |
| 2010/0266285 | A1* | 10/2010 | Healey | H04J 3/0682 398/79 |
| 2011/0033187 | A1* | 2/2011 | Rossetti | H04J 14/02 398/79 |
| 2011/0135309 | A1* | 6/2011 | Lee | H04B 10/2587 398/79 |
| 2011/0188859 | A1* | 8/2011 | Wen | H04J 14/0282 398/79 |
| 2011/0222855 | A1* | 9/2011 | Kim | H04J 14/0282 398/79 |
| 2011/0236021 | A1* | 9/2011 | Presi | H04B 10/2587 398/67 |
| 2012/0237220 | A1* | 9/2012 | Presi | H04B 10/2587 398/50 |
| 2012/0321316 | A1* | 12/2012 | Presi | H04B 10/2587 398/67 |
| 2014/0064727 | A1* | 3/2014 | Presi | H04B 10/2572 398/49 |
| 2014/0193156 | A1* | 7/2014 | Cavaliere | H04J 14/0201 398/83 |
| 2015/0063803 | A1* | 3/2015 | Ciaramella | H04J 14/0246 398/49 |

FOREIGN PATENT DOCUMENTS

| | | |
|---|---|---|
| JP | 2006121639 A | 5/2006 |
| JP | 2010021976 A | 1/2010 |
| WO | 2009123572 A1 | 10/2009 |
| WO | 2010025767 A1 | 3/2010 |
| WO | 2011134536 A1 | 11/2011 |
| WO | 2012034604 A1 | 3/2012 |

OTHER PUBLICATIONS

Decision to Grant a Patent, Japanese Application No. 2014-521960, dated Aug. 28, 2015, 6 Pages.
First Office Action and Search Report, Chinese Application No. 201180072668.1, dated Feb. 2, 2016, 13 Pages.
International Preliminary Report on Patentability (Chapter 1), International Application No. PCT/EP2011/063163, dated Feb. 4, 2014, 10 pages.
International Search Report, International Application No. PCT/EP2011/063163, dated Apr. 4, 2012, 6 pages.
Non-Final Office Action, U.S. Appl. No. 14/236,071, dated Apr. 15, 2016, 15 pages.
Notice of Allowance, U.S. Appl. No. 14/236,071, dated Aug. 23, 2016, 15 pages.
Notification of Reasons for Refusal, Japanese Application No. 2014-521960, dated Mar. 13, 2015, 9 Pages.
Patent Examination Report No. 1, Australian Application No. 2011374213, dated Oct. 27, 2014, 4 pages.
Presi M., et al., "Stable Self-Seeding of R-SOAs for WDM-PONs," OFC/NFOEC, IEEE Optical Fiber Communication Conference, 2011, 3 pages.
Requirement for Restriction/Election, U.S. Appl. No. 14/236,071, dated Jan. 7, 2016, 7 pages.
Wong E., "Directly Modulated Self-Seeding Reflective Semiconductor Optical Amplifiers as Colorless Transmitters in Wavelength Division Multiplexed Passive Optical Networks," Journal of Lightwave Technology, 2007, vol. 25 (1), pp. 67-74.
Written Opinion, International Application No. PCT/EP2011/063163, dated Apr. 4, 2012, 9 pages.

* cited by examiner

OPTICAL ACCESS NETWORK

CROSS-REFERENCE TO RELATED APPLICATIONS

This application is a divisional of U.S. application Ser. No. 14/236,071, entered Aug. 19, 2014, which is a National stage of International Application No. PCT/EP2011/063163, filed Jul. 29, 2011, which are hereby incorporated by reference.

TECHNICAL FIELD

Communications traffic at network edges is increasing over time due to the rising demand for a range of high-bandwidth services by business and residential customers. This rising demand places an increasing requirement on access networks to deliver those services.

One type of access network suitable for high-bandwidth services is a Passive Optical Network (PON). A PON typically has a central office (CO) at which apparatus called an Optical Line Terminal (OLT) interfaces with at least one metro or carrier network. An arrangement of optical fibres and splitters connect the Central Office to Optical Network Units (ONU) deployed across a service area. A Wavelength Division Multiplexed Passive Optical Network (WDM-PON) supports multiple wavelength channels, called lambdas. A separate wavelength channel is allocated for communication between an Optical Line Terminal (OLT) and an ONU in the WDM-PON.

It is desirable that apparatus deployed at ONUs of the access network is "colourless". This means that the apparatus deployed at ONUs is not wavelength-specific but, instead, is capable of operating across a range of wavelengths. This allows an economy of scale in manufacturing the ONU apparatus. The configuration of the operating wavelength of an ONU is made by other apparatus in the network, external to the ONU.

There are several different approaches to WDM-PONs with colourless transceivers. One approach remotely seeds the ONUs. A seeding light is transmitted downstream from the OLT to ONUs. Each ONU receives a particular wavelength and a low-cost colourless source, such as a Fabry Perot laser diode, "locks" to the seeding light. The generated light is modulated with data to form an upstream optical signal. Another approach uses the same wavelength for downstream and upstream communication. An ONU receives the downstream signal, amplifies it, and modulates it with data to form an upstream optical signal. Both of these approaches require an external source at the OLT to generate the seeding light.

Another approach is called "self-seeding". This approach is described in the paper "Directly Modulated Self-Seeding Reflective Semiconductor Optical Amplifiers as Colourless Transmitters in Wavelength Division Multiplexed Passive Optical Networks", Wong et al, Journal of Lightwave Technology, Vol. 25, No. 1, January 2007. A Reflective Semiconductor Optical Amplifier (R-SOA) at an ONU generates broadband amplified spontaneous emission (ASE) light. The light is transmitted upstream. An Arrayed Waveguide Grating (AWG) at a remote node reflects a spectral slice of the broadband light back to the ONU for use as a seeding light. This locks the transmitted wavelength of the R-SOA. The R-SOA is directly modulated with upstream data. The approach described in the above paper has a tight power budget and only operates with a bit rate of 1.25 Gb/s, which is too low for some applications such as wireless backhaul.

The present invention seeks to provide an alternative self-seeded optical access network.

SUMMARY

An aspect of the invention provides an optical network unit for an optical access network. The optical network unit comprises a first port for connecting to a first optical link and a second port for connecting to a second optical link. The optical network unit comprises an optical source arranged to generate a first optical signal and to transmit the first optical signal via the first port. The optical source is further arranged to receive an optical seed signal via the first port and to amplify the optical seed signal. The optical seed signal has a narrower bandwidth compared to the first optical signal. The optical network unit further comprises a modulator arranged to modulate the amplified optical seed signal with upstream data to form an upstream optical signal and to transmit the upstream optical signal via the second port.

Apparatus according to an embodiment of the invention has an advantage that it has improved performance due to physical separation, on the first optical link and second optical link, of signals at the same wavelength. The first optical signal and the optical seed signal are continuous wave signals which travel along the first optical link. The upstream optical signal travels along the second optical link.

Advantageously, the optical seed signal has a different polarisation compared to the first optical signal.

Apparatus according to an embodiment of the invention has an advantage that the transmitter of the optical network unit seeds itself, without the need for an external source.

Advantageously, the modulator is capable of operating at bit rates of 10 Gb/s or more. The modulator can comprise an electro-absorption modulator.

The optical source can be a device such as a reflective semiconductor optical amplifier (R-SOA) or a Fabry-Perot laser diode (FP-LD).

Another aspect of the invention provides apparatus for an optical access network comprising a polarisation modifier and a wavelength router. The wavelength router comprises a first port for connecting to a first optical link to an optical network unit. The wavelength router comprises a second port for connecting to the polarisation modifier. The wavelength router comprises a third port for connecting to a second optical link to an optical network unit. The wavelength router comprises a fourth port for connecting to a third optical link to an optical line terminal of the access network. The wavelength router can comprise an arrayed waveguide grating. The wavelength router is arranged to receive a first optical signal via the first port and forward the first optical signal via the second port to the polarisation modifier. The wavelength router is further arranged to receive a polarisation modified optical signal from the polarisation modifier via the second port, to filter the polarisation modified optical signal to form an optical seed signal, and to output the optical seed signal via the first port.

Advantageously, the polarisation modifier is arranged to rotate the polarisation of the first optical signal by a value of substantially 90° to form the optical seed signal.

Advantageously, the wavelength router is further arranged to receive an upstream optical signal via the third port and to forward the upstream optical signal via the fourth port.

Advantageously, the wavelength router is arranged to receive a downstream optical signal via the fourth port and to one of: forward the downstream optical signal via the first port; and forward the downstream optical signal via the third port.

Advantageously, the polarisation modifier comprises a Faraday rotator mirror.

Another aspect of the invention comprises an optical access network comprising an optical network unit, or a plurality of optical network units, and the above apparatus.

Another aspect of the invention comprises a method of forming an optical signal at an optical network unit. The method comprises generating a first optical signal. The method further comprises transmitting the first optical signal via a first port of the optical network unit connected to a first optical link. The method further comprises receiving an optical seed signal via a second port of the optical network unit connected to a second optical link. The method further comprises amplifying the optical seed signal, wherein the optical seed signal has a narrower bandwidth compared to the first optical signal. The method further comprises modulating the amplified optical seed signal with upstream data to form an upstream optical signal. The method further comprises transmitting the upstream optical signal via the second port.

Advantageously, the optical seed signal has a different polarisation compared to the first optical signal.

Advantageously, the first optical signal has a spectrum comprising a plurality of different wavelengths and the optical seed signal has a spectrum centred on one of the wavelengths.

Another aspect of the invention comprises a method of processing an optical signal. The method comprises receiving a first optical signal via a first port of a wavelength router. The method further comprises forwarding the first optical signal via a second port of the wavelength router to a polarisation modifier. The method further comprises receiving a polarisation modified optical signal from the polarisation modifier via the second port. The method further comprises filtering the polarisation modified optical signal to form an optical seed signal. The method further comprises outputting the optical seed signal via the first port. The method further comprises receiving an upstream optical signal via a third port of the wavelength router and forwarding the upstream optical signal via a fourth port of the wavelength router. The method can be performed at a remote node of the optical access network.

BRIEF DESCRIPTION OF THE DRAWINGS

Embodiments of the invention will be described, by way of example only, with reference to the accompanying drawings in which.

DETAILED DESCRIPTION

Figure 1:
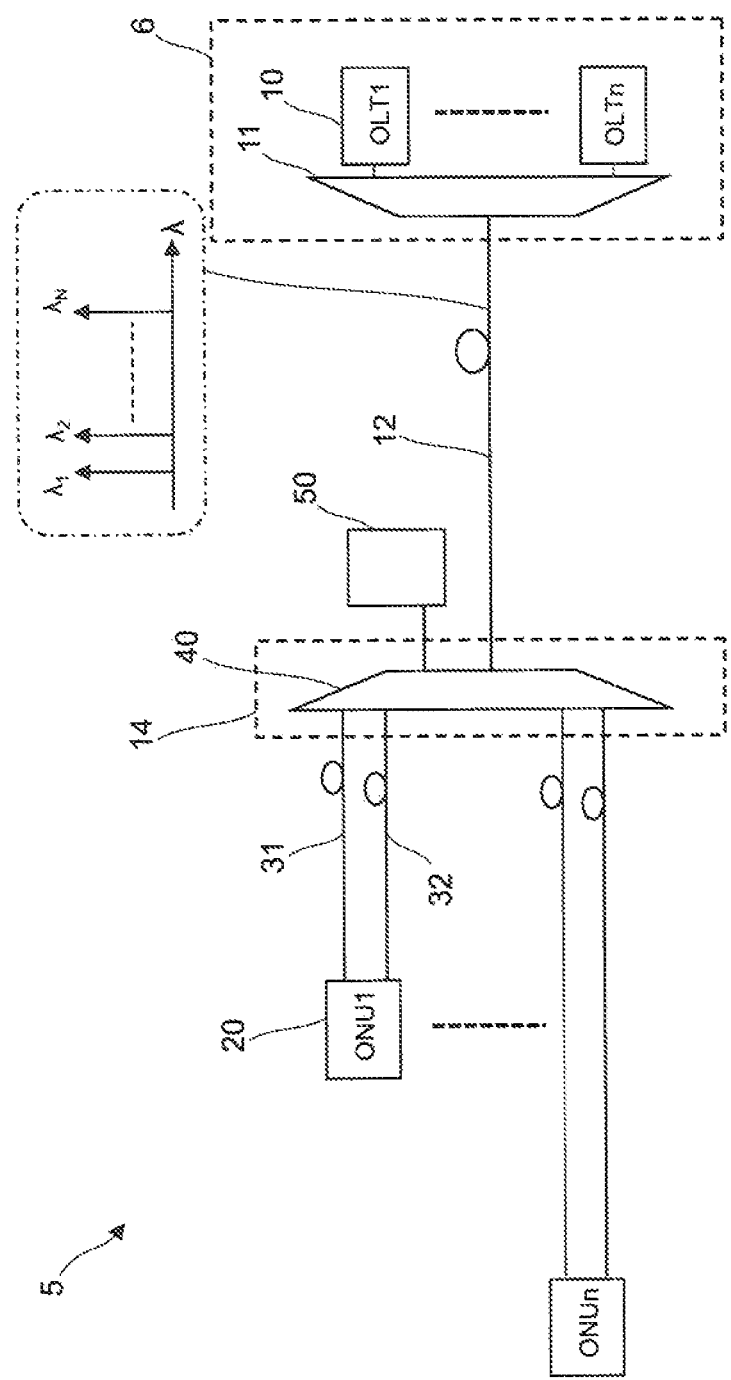
FIG. 1 shows an optical access network.

FIG. 1 shows an optical access network 5 according to an embodiment of the invention. An Optical Line Terminal (OLT) 10 connects to an Optical Network Unit (ONU) 20 via an optical path. The optical path between the OLT 10 and ONU 20 can comprise a remote node 14 (also called a distribution node) which connects to a plurality of ONUs 20. A trunk fibre 12 connects the OLT 10 to the remote node 14.

The ONU 20 terminates the optical path of the access network. The ONU 20 can be installed at a subscriber premises, such as a home or business premises. This scenario is typically called Fibre To The Home (FTTH) or Fibre To The Premises (FTTP). Alternatively, an ONU can be installed at a unit which serves a plurality of premises. A unit can be positioned at a streetside cabinet or can serve an apartment building. This scenario is typically called Fibre To The Node (FTTN), Fibre To The Curb (FTTC), Fibre To The Cabinet (FTTCab) or Fibre To The Building (FTTB). Alternatively, the ONU 20 can provide backhaul from a wireless base station or access point.

Each ONU 20 is connected to the remote node 14 by a dedicated optical path 31, 32. The optical path comprises a pair of optical links 31, 32.

A plurality of OLTs 10 are provided at a node 6 for communicating with ONUs 20 deployed in the access network. A multiplexer/demultiplexer 11 is provided. In the downstream direction (towards ONUs 20), multiplexer/demultiplexer 11 combines signals output by OLTs 10 for forwarding along trunk fibre 12 to the remote node 14. In the upstream direction, (towards OLTs 10) multiplexer/demultiplexer 11 demultiplexes signals received from the remote node 14 and forwards them to OLTs 10. OLTs 10 connect to one or more operator networks (not shown).

The overall network 5 is typically called a Passive Optical Network (PON) because the optical transmission has no power requirements, or limited power requirements, once an optical signal is travelling through the network section connecting the ONU to the OLT. The access network 5 can be a Wavelength Division Multiplexed Passive Optical Network (WDM-PON). A set of optical wavelength carriers are used to serve ONUs. Each ONU 20 is served by a different wavelength carrier. The wavelength carriers are also called wavelength channels, or lambdas (λ). In the downstream direction, a wavelength router at the remote node 14 demultiplexes lambdas received on trunk fibre 12 and outputs lambdas on different ones of the fibres 15, such that a single lambda is forwarded from RN 14 to an ONU 20 which uses that lambda. In the upstream direction, the wavelength router at remote node 14 receives lambdas on the plurality of fibres 15, multiplexes them, and outputs the multiplexed combination of lambdas on trunk fibre 12.

In the network of FIG. 1, each ONU 20 is "self-seeding". This means that an ONU 20 does not require a seed signal from an external source such as an OLT 10. Instead, an ONU 20 generates a signal which is used to seed itself.

Figure 2:
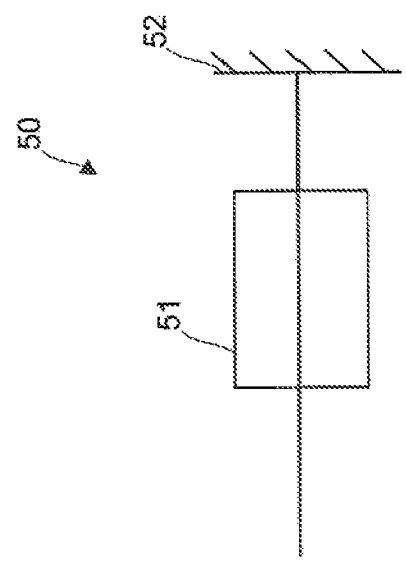
FIG. 2 shows a polarisation modifier for use in the network of FIG. 1.

The wavelength router 40 at remote node 14 is connected to a device 50. Device 50 can be arranged to return an optical signal back to the remote node, either directly or after some filtering or amplification. In a simplest form, device 50 can comprise a mirror. Advantageously, device 50 is a device which is also arranged to modify, or compensate or stabilise, the polarisation of an incident optical signal. This device will be called a polarisation modifier 50. The effect of the polarisation modifier 50 is that an optical signal leaving the device 50 has a different polarisation compared to the polarisation of the signal entering the device. The polarisation modifier 50 can be a Faraday Rotator Mirror (FRM), which is also known as a Faraday mirror. As shown in FIG. 2, a Faraday Rotator Mirror is a combination of a Faraday Rotator 51 and a mirror 52. A Faraday rotator has an effect of rotating the polarisation of an optical signal passing through the device by a fixed angle, independently of the propagation direction (left to right or right to left in FIG. 2). Typically, the Faraday rotator is arranged to rotate the polarisation of a signal by a total of 90°, comprising a polarisation rotation of 45° during the forward passage through the device 51 and a polarisation rotation of a further 45° during the return passage through the device 51, after reflection by the mirror 52. The wavelength router at remote node 14 is arranged to forward signals to and from the polarisation modifier 50 via port 42. An advantage of the polarisation modifier 50 is that it can stabilise the polarisation of the optical signals used to seed the ONU 20 and therefore reduce intensity noise due to polarisation instabilities.

Optionally, the remote node 14 can also include additional filtering (i.e. in addition to the filtering effect of the AWG) and/or an optical amplifier, as described in the Wong reference.

Figure 3A:
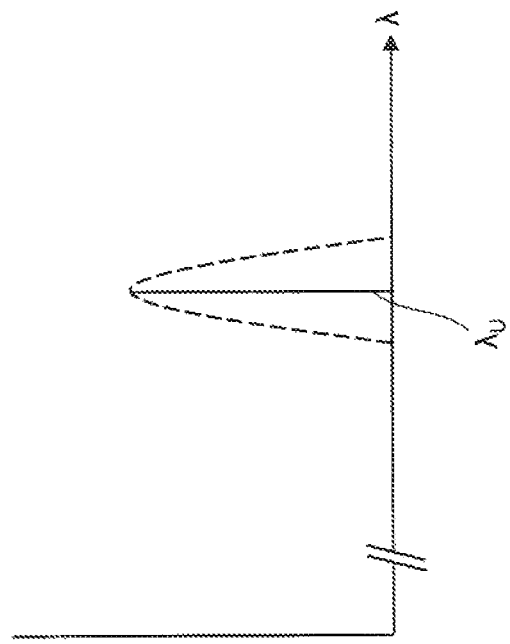
FIG. 3A shows an example of a filter response of an Arrayed Waveguide Grating (AWG) at the remote node of FIG. 3.
Figure 3:
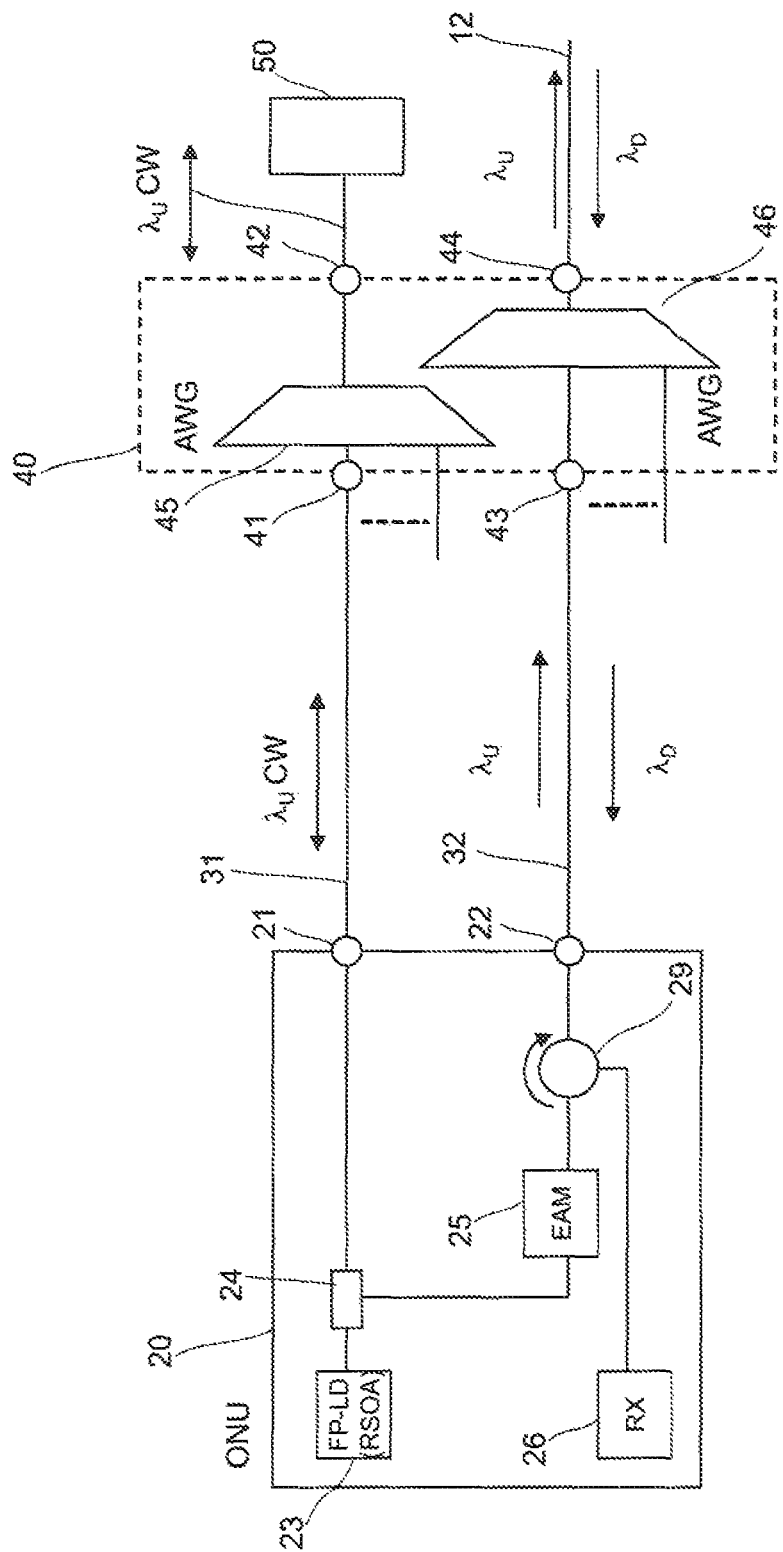
FIG. 3 shows an embodiment of apparatus at an Optical Network Unit (ONU) and a remote node (RN) of the network of FIG. 1.
Figure 4:
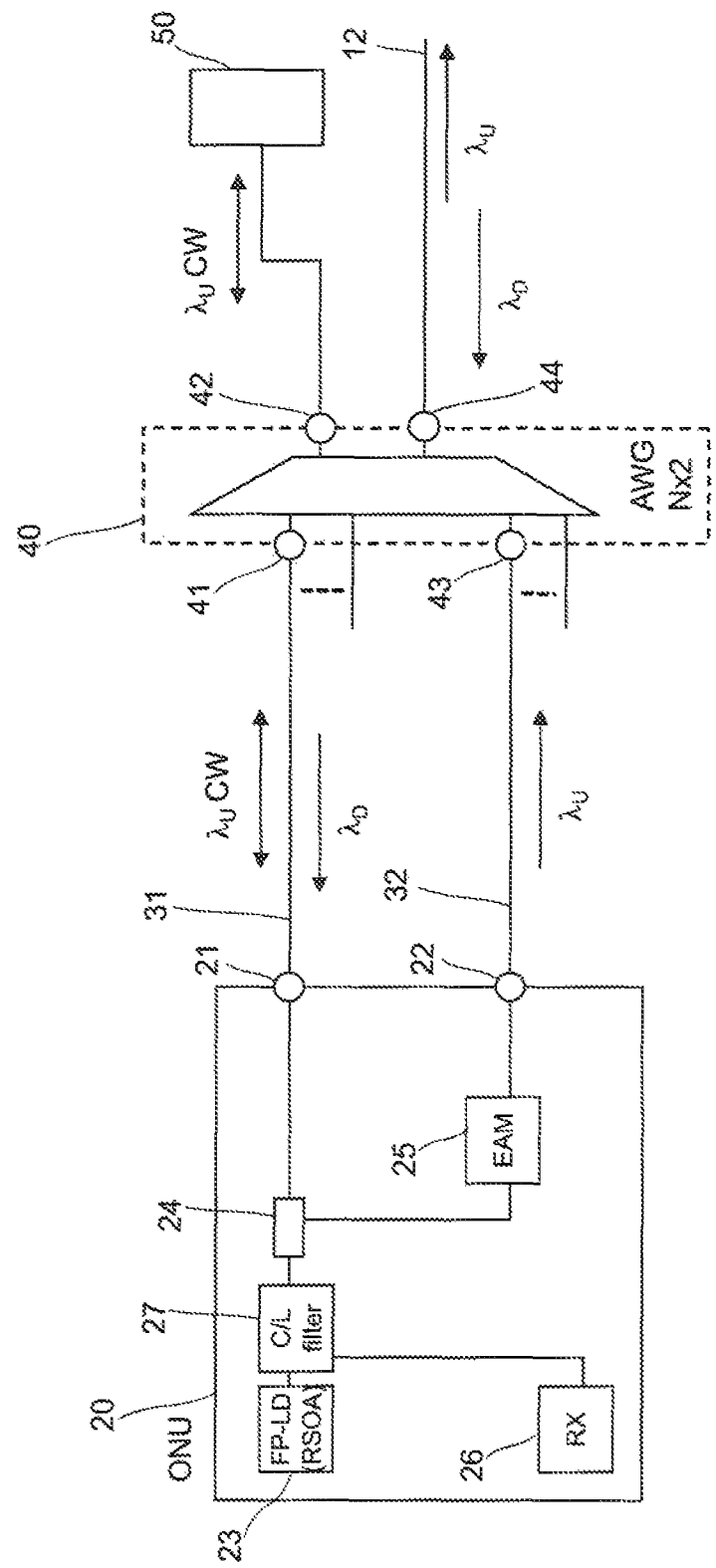
FIG. 4 shows another embodiment of apparatus at an Optical Network Unit and a remote node of the network of FIG. 1.
Figure 5:
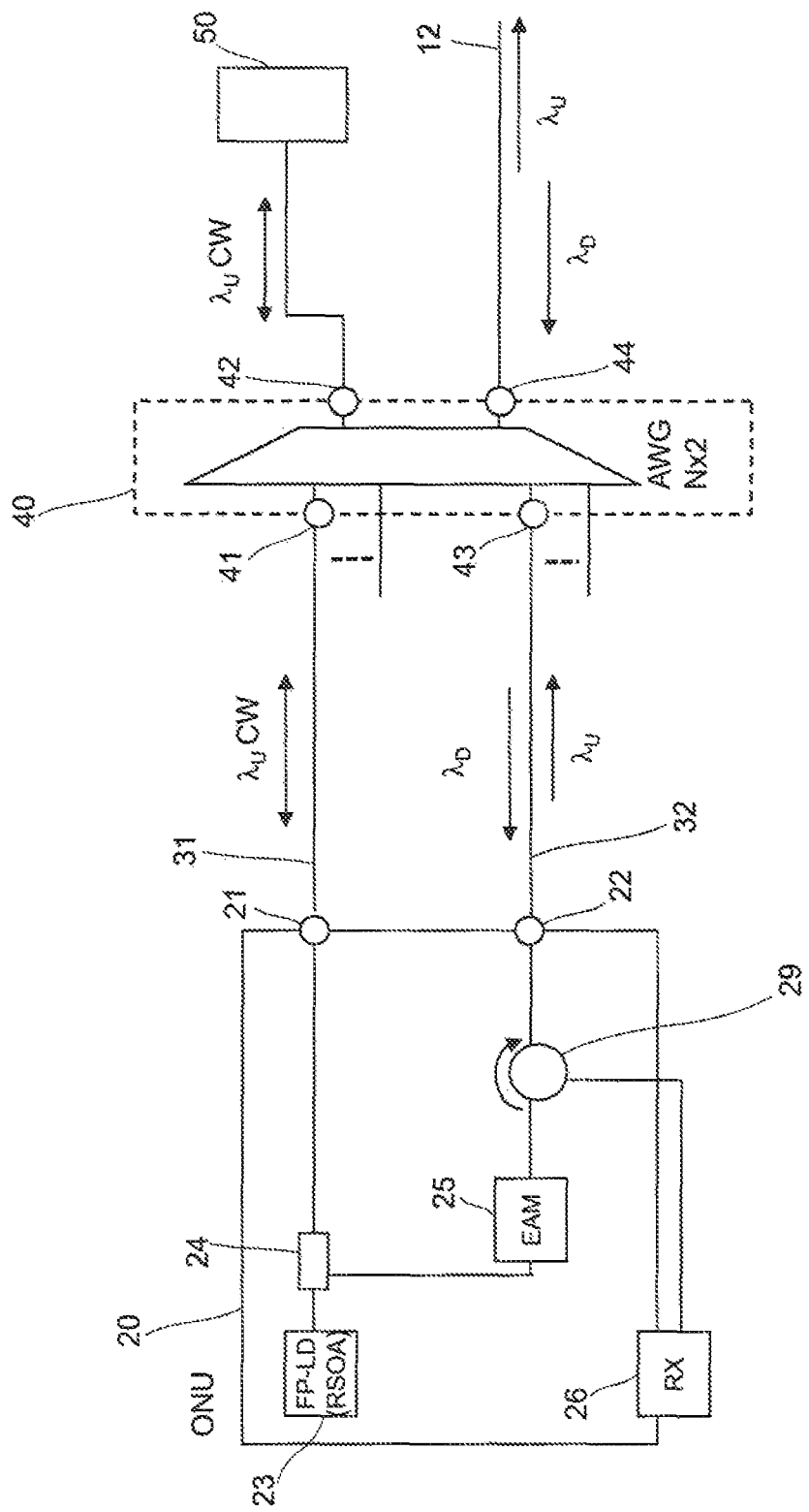
FIG. 5 shows another embodiment of apparatus at an Optical Network Unit and a remote node of the network of FIG. 1.

FIGS. 3 to 5 show embodiments of apparatus provided at an ONU 10 and a remote node 14.

FIG. 3 shows a first embodiment of apparatus provided at an ONU 10 and a remote node 14. An ONU 20 is connected to a remote node 14 by two optical links 31, 32. A first port 21 of ONU 20 connects to the first optical link 31. A second port 22 of ONU 20 connects to the second optical link 32. The downstream optical signal is $\lambda_D$. The upstream optical signal is $\lambda_U$. The optical signals used to seed the ONU are $\lambda_U$ CW. The downstream signal $\lambda_D$ and the upstream signal $\lambda_U$ are at different wavelengths. The downstream signal $\lambda_D$ and the upstream signal $\lambda_U$ can be in different wavelength bands (e.g. the C band and L band), or they can be in the same wavelength band. The upstream signal $\lambda_U$ and the signals $\lambda_U$ CW used to seed the ONU are at the same wavelength. Other ONUs in the network use different values of $\lambda_U$, $\lambda_U$ CW and $\lambda_D$ from those allocated to the ONU shown in FIG. 2.

In FIG. 3, signals $\lambda_U$ and $\lambda_U$ CW are carried by different ones of the optical links 31, 32. Signals $\lambda_U$ CW are carried by link 31 and signal $\lambda_U$ is carried by link 32. This physical separation of the paths travelled by signals at the same wavelength can improve performance of the network. Downstream signal $\lambda_D$ is carried by link 32.

A self-tunable laser source is achieved by a combination of an optical device 23, such as a Fabry-Perot laser diode (FP-LD) or Reflective-Semiconductor Optical Amplifier (R-SOA) at the ONU 20, link 31, a filtering effect provided by AWG 45 and a mirror provided by device 50. The source 23 is arranged to generate a first optical signal in the form of broadband Amplified Spontaneous Emission (ASE) light and transmit this upstream via port 21 and link 31 to a wavelength router 40. The wavelength router 40 is arranged to receive the ASE signal via port 41 and forward the signal via port 42 to the polarisation modifier 50. The polarisation modifier 50 is arranged to rotate the polarisation of the received signal by a predetermined amount and then, after reflection, return the polarisation modified signal to the wavelength router 40 via port 42. The wavelength router 40 has a narrowband filtering effect on the polarisation modified signal. The narrowband filtering is centred on the wavelength allocated to the particular ONU. The filtered and polarisation modified optical signal forms the optical seed signal for the ONU 20. This seed signal is returned to the ONU along link 31. The source 23 is arranged to operate in an injection locked manner. The seed signal causes the source 23 to lock to the wavelength of the seed signal and lase at that wavelength. Thus, optical source 23 can be considered to amplify the seed signal.

A splitter 24 at the ONU 20 is arranged to split a portion of the signal and forward it to a modulator 25. The modulator 25 can be a device such as an Electro-Absorption Modulator (EAM). The modulator 25 is arranged to modulate the signal received from splitter 24 with upstream data, thereby forming an upstream signal $\lambda_U$. A circulator 29 forwards the upstream signal $\lambda_U$ to port 22 and optical link 32. Modulator 25 can use an amplitude/intensity modulation format such as Non Return to Zero (NRZ) or Return to Zero (RZ). Wavelength router 40 is arranged to forward the upstream signal $\lambda_U$ via port 44 to link 12 which connects to the OLT 10. Circulator 29 is also connected to a receiver and is arranged to forward a downstream signal $\lambda_D$ received via port 22 to receiver 26.

The polarisation modifier 50 is shared by a plurality of ONUs 20 in the network. For each ONU 20, a first optical signal and a modified/compensated optical seed signal are generated in the same way as described above.

Optical links between the wavelength router 40 and one ONU 20 are shown in FIG. 3. Wavelength router 40 connects to a plurality of different ONUs in the same manner as shown for ONU 20. Therefore, there is a set of ports 41 connecting to respective first optical links 31 and a set of ports 43 connecting to respective second optical links 32.

In the downstream direction, wavelength router 40 demultiplexes lambdas received at port 44 via trunk fibre 12 and outputs different lambdas on different ports 43. In the upstream direction, the wavelength router 40 receives upstream signals at different lambdas on a set of ports 43, multiplexes them, and outputs the multiplexed combination of lambdas on trunk fibre 12.

In FIG. 3 the wavelength router 40 comprises two separate wavelength routing devices 45, 46, such as AWGs. AWG 45 connects to a plurality of optical links 31 (connected to different ONUs) and to the FRM 50. Each port of AWG 45 has a narrowband filter centred on a different wavelength, e.g. port 1 filters about $\lambda_1$, port 2 filters about $\lambda_2$, and so on. Therefore, each ONU will receive a seed signal having a wavelength dedicated to that ONU. AWG 46 connects to a plurality of optical links 32 (connected to different ONUs) and to link 12 which connects to the OLTs 10. FIG. 3A shows a filter response of the AWG 46 for the port connecting to the ONU 20 shown in FIG. 3. The AWG 46 has a response which forwards a spectral slice of the overall ASE, centred on the wavelength $\lambda_U$.

FIG. 4 shows another embodiment of apparatus provided at an ONU 10 and a remote node 14. As in FIG. 3, an ONU 20 is connected to a remote node 14 by two optical links 31, 32. A first port 21 of ONU 20 connects to the first optical link 31. A second port 22 of ONU 20 connects to the second optical link 32.

The signals $\lambda_U$ and $\lambda_U$ CW are carried by different ones of the optical links 31, 32. Signals $\lambda_U$ CW are carried by link 31 and signal $\lambda_U$ is carried by link 32. This physical separation of the paths travelled by signals at the same wavelength can improve performance of the network. Downstream signal $\lambda_D$ is carried by link 31.

An optical device 23 such as a Fabry-Perot laser diode (FP-LD) or Reflective-Semiconductor Optical Amplifier (R-SOA) operates as a self-tunable laser source. The source 23 is arranged to generate a first optical signal in the form of broadband Amplified Spontaneous Emission (ASE) light and transmit this upstream via port 21 and link 31 to a port 41 of the wavelength router 40. The wavelength router 40 is arranged to forward the signal via port 42 to the polarisation modifier 50. The polarisation modifier 50 is arranged to rotate the polarisation of the received signal by a predetermined amount and then return the polarisation modified signal to the wavelength router 40 via port 42. The wavelength router 40 has a narrowband filtering effect on the polarisation modified signal, with the filtering centred on the wavelength allocated to the particular ONU. The filtered and polarisation modified optical signal forms the optical seed signal for the ONU 20. This seed signal is returned to the ONU along link 31. The source 23 is arranged to operate in an injection locked manner. The seed signal causes the source 23 to lock to the wavelength of the seed signal and lase at that wavelength. Thus, optical source 23 can be considered to amplify the seed signal. A splitter 24 at the ONU 20 is arranged to split a portion of the signal and forward it to a modulator 25. The modulator 25 can be a device such as an Electro-Absorption Modulator (EAM). The modulator 25 is arranged to modulate the signal with upstream data, thereby forming an upstream signal $\lambda_U$. As link 32 only carries the upstream signal, modulator 25 connects to port 22. Wavelength router 40 is arranged to forward the upstream signal $\lambda_U$ to link 12 which connects to the OLT 10.

A filter 27 separates the downstream signal $\lambda_D$ and the upstream signals $\lambda_U$ CW. In an advantageous embodiment the downstream and upstream signals are in different bands and the filter 27 can comprise a C-band/L-band filter. Filter 27 is connected to a receiver 26.

As before, each port 41 of AWG 45 has a narrowband filter centred on a different wavelength, e.g. port 1 filters about $\lambda_1$, port 2 filters about $\lambda_2$, and so on. Therefore, each ONU will receive a seed signal having a wavelength dedicated to that ONU. AWG 46 connects to a plurality of optical links 32 (each connected to respective ONUs) and to link 12 which connects to the OLTs 10.

As before, wavelength router 40 connects to a plurality of different ONUs in the same manner as shown for ONU 20. Therefore, there is a set of ports 41 connecting to respective first optical links 31 and a set of ports 43 connecting to respective second optical links 32.

In the downstream direction, wavelength router 40 demultiplexes lambdas received at port 44 via trunk fibre 12 and outputs different lambdas on different ports 43. In the upstream direction, the wavelength router 40 receives upstream signals at different lambdas on a set of ports 43, multiplexes them, and outputs the multiplexed combination of lambdas on trunk fibre 12.

In FIG. 4 the wavelength router 40 comprises a single AWG, which is an N×2 AWG device with frequency-periodic properties. A wavelength $\lambda_1$ arriving at a first port 42 of the AWG is routed to port 41. The same wavelength $\lambda_1$ arriving at a second port of the AWG is routed to port 43. The routing of a particular wavelength, applied to port 44, is shifted by a fixed integer number M of ports (in this case M=1) compared to the routing for the same wavelength applied to port 42. The same properties apply to a set of wavelengths $\lambda_1, \lambda_2, \ldots \lambda_N$ applied to any of the ports. The routing properties of the AWG are cyclic.

FIG. 5 shows another embodiment of apparatus provided at an ONU 10 and a remote node 14. The apparatus shown in FIG. 4 is similar to that of FIG. 3, except that the wavelength router is a single cyclic AWG. Light at $\lambda_U$ arriving at port 41 is routed to port 42. Light at the same wavelength arriving at port 43 is routed to port 44.

Figure 6:
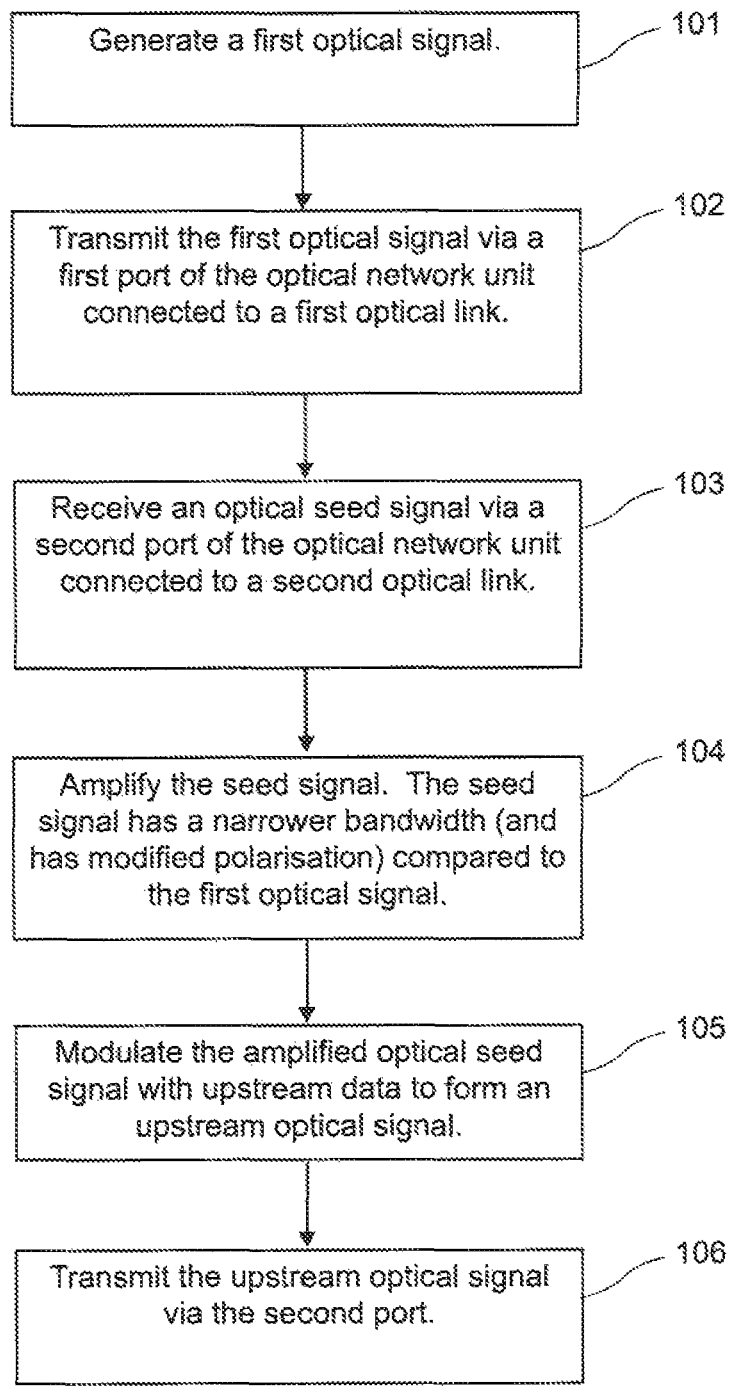
FIG. 6 shows a method of forming an optical signal at an Optical Network Unit (ONU) of the network.

FIG. 6 shows a method of forming an optical signal at an optical network unit 20. The method comprises generating 101 a first optical signal and transmitting 102 the first optical signal via a first port 21 of the optical network unit 20 connected to a first optical link 31. The method further comprises receiving 103 an optical seed signal via a second port 22 of the optical network unit 20 connected to a second optical link 32. The optical seed signal is a modified form of the first optical signal, which has a narrower bandwidth and has modified polarisation compared to the first optical signal. The method further comprises amplifying 104 the optical seed signal. The method further comprises modulating 105 the amplified optical seed signal with upstream data to form an upstream optical signal and transmitting 106 the upstream optical signal via the second port 22.

Figure 7:
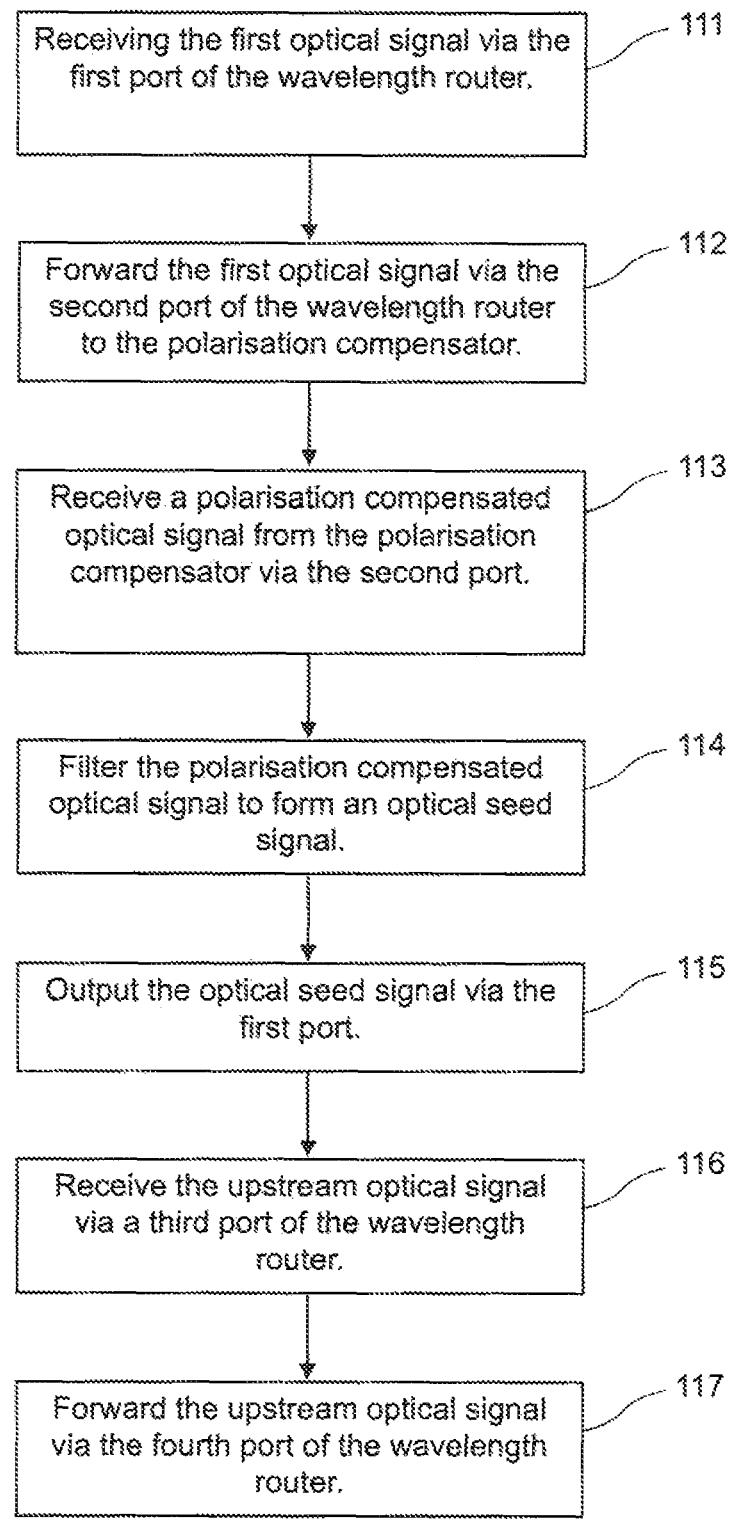
FIG. 7 shows a method of processing an optical signal at a remote node of the network.

FIG. 7 shows a method of processing an optical signal comprising receiving 111 a first optical signal via a first port 41 of a wavelength router 40 and forwarding 112 the first optical signal via a second port 42 of the wavelength router 40 to a polarisation modifier 50. The method further comprises receiving 113 a polarisation modified optical signal from the polarisation modifier 50 via the second port 42. The method further comprises filtering 114 the polarisation modified optical signal to form an optical seed signal and outputting 115 the optical seed signal via the first port 41. The method further comprises receiving 116 an upstream optical signal via a third port 43 of the wavelength router 40 and forwarding 117 the upstream optical signal via a fourth port 44 of the wavelength router 40.

In any of the embodiments, the remote node may stabilise the polarisation of the seed signal. This reduce the polarisation fluctuations, hence the intensity fluctuations of the CW lightwaves, which is externally modulated. Controlling the polarisation of the seed signal may improve operation of a reflective optical amplifier arranged to receive the seed signal.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A wavelength router apparatus for an optical access network comprising:
   a first port for connecting to a first optical link to an optical network unit (ONU); and
   a second port for connecting to a polarisation modifier,
   wherein the wavelength router apparatus is arranged to:
      receive a first optical signal via the first port,
      forward the first optical signal via the second port to the polarisation modifier,
      receive a polarisation modified optical signal from the polarisation modifier via the second port, wherein the polarisation modified optical signal has a different polarization compared to the first optical signal,
      filter the polarisation modified optical signal to form an optical seed signal, and
      output the optical seed signal via the first port.

2. The wavelength router apparatus of claim 1, further comprising:
  a third port for connecting to a second optical link to the ONU; and
  a fourth port for connecting to a third optical link to an optical line terminal (OLT) of the optical access network.

3. The wavelength router apparatus of claim 2, wherein the wavelength router apparatus is further arranged to receive an upstream optical signal via the third port and to forward the upstream optical signal via the fourth port.

4. The wavelength router apparatus of claim 2, wherein the wavelength router apparatus is further arranged to:
  receive a downstream optical signal via the fourth port; and
  forward the downstream optical signal via the first port or the third port.

5. The wavelength router apparatus of claim 1, wherein the wavelength router apparatus comprises an arrayed waveguide grating.

6. The wavelength router apparatus of claim 1, wherein the optical seed signal has a narrower bandwidth compared to the first optical signal.

7. The wavelength router apparatus of claim 6, wherein the first optical signal has a spectrum comprising a plurality of different wavelengths and the optical seed signal has a spectrum centred on one of the plurality of different wavelengths.

8. A method in a wavelength router in an optical access network comprising:
  receiving a first optical signal via a first port of the wavelength router;
  forwarding the first optical signal via a second port of the wavelength router to a polarisation modifier;
  receiving a polarisation modified optical signal from the polarisation modifier via the second port, wherein the polarisation modified optical signal has a different polarization compared to the first optical signal;
  filtering the polarisation modified optical signal to form an optical seed signal; and
  outputting the optical seed signal via the first port.

9. The method of claim 8, further comprising:
  receiving an upstream optical signal via a third port of the wavelength router; and
  forwarding the upstream optical signal via a fourth port of the wavelength router to an optical line terminal (OLT) of the optical access network.

10. The method of claim 8, wherein the wavelength router comprises an arrayed waveguide grating.

11. The method of claim 8, wherein the optical seed signal has a narrower bandwidth compared to the first optical signal.

12. The method of claim 11, wherein the first optical signal has a spectrum comprising a plurality of different wavelengths and the optical seed signal has a spectrum centred on one of the plurality of different wavelengths.

* * * * *